Figure 1:
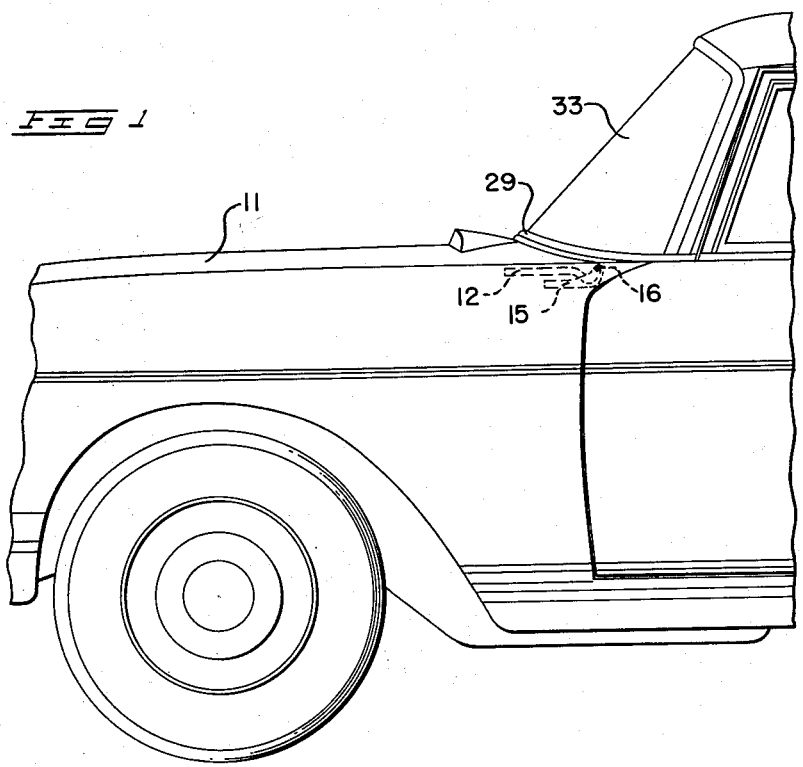

Dec. 31, 1963    W. E. HÄCKER    3,115,946
HINGE CONSTRUCTION FOR VEHICLES
Filed Dec. 14, 1959    4 Sheets-Sheet 1

INVENTOR
WALTER E. HÄCKER
BY Dirke, Craig + Freudenberg
ATTORNEY

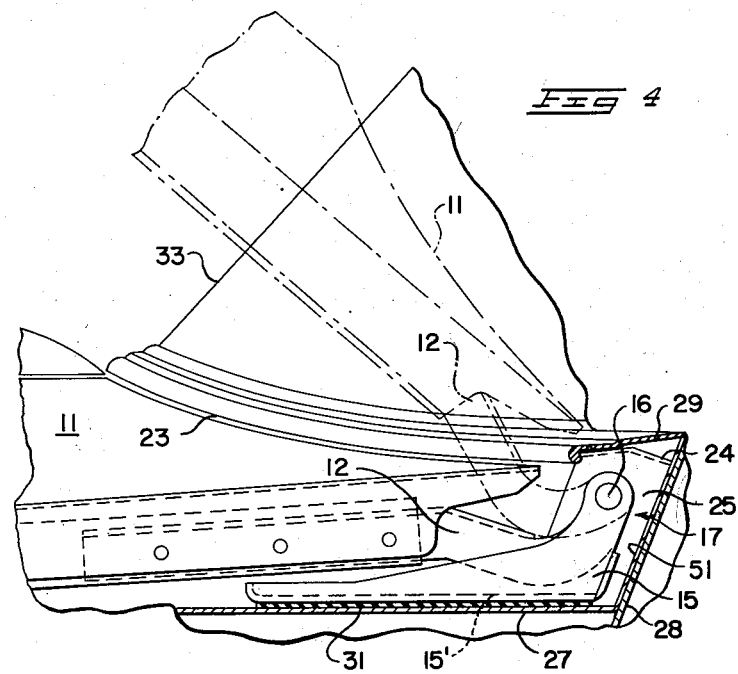
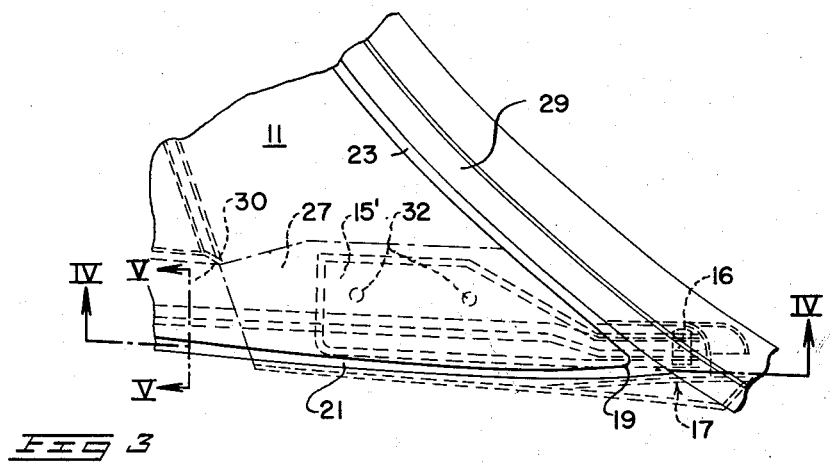

Dec. 31, 1963 W. E. HÄCKER 3,115,946
HINGE CONSTRUCTION FOR VEHICLES
Filed Dec. 14, 1959 4 Sheets-Sheet 3

INVENTOR
WALTER E. HÄCKER
BY Dicker, Craig + Freudenberg
ATTORNEY

Dec. 31, 1963   W. E. HÄCKER   3,115,946
HINGE CONSTRUCTION FOR VEHICLES
Filed Dec. 14, 1959   4 Sheets-Sheet 4
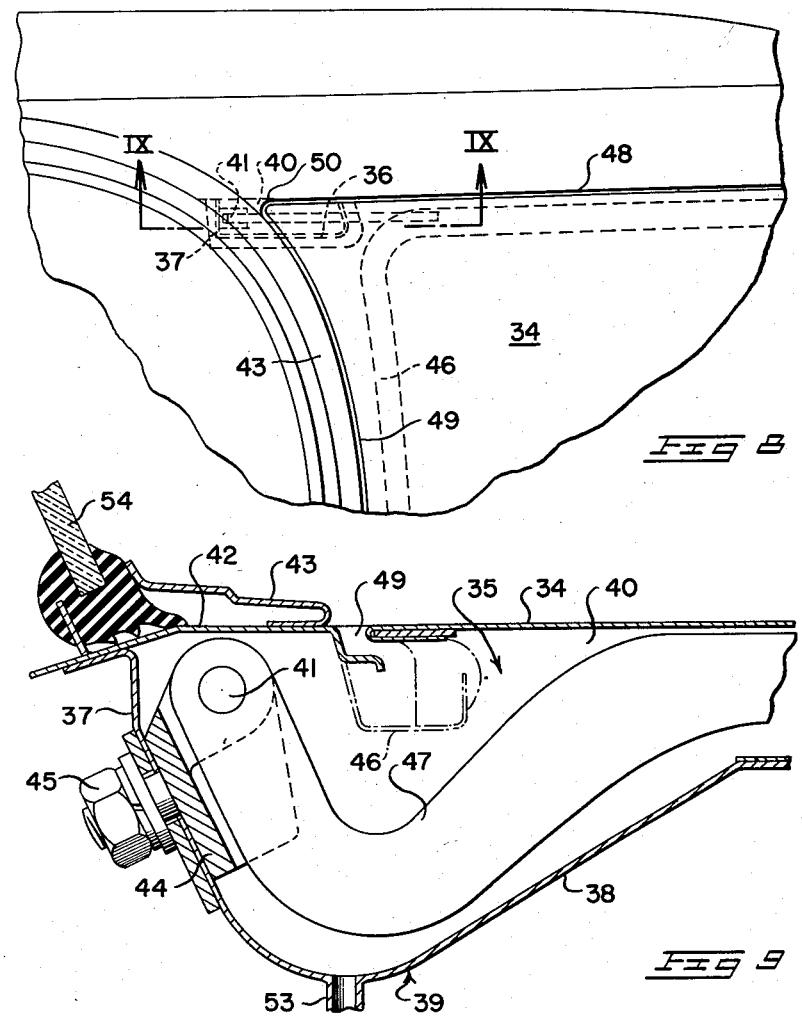
INVENTOR
WALTER E. HÄCKER
BY Dicke, Craig & Freudenberg
ATTORNEY United States Patent Office 3,115,946
Patented Dec. 31, 1963

3,115,946
HINGE CONSTRUCTION FOR VEHICLES
Walter E. Häcker, Aidlingen, Kreis Boblingen, Germany, assignor to Daimler-Benz Aktiengesellschaft, Stuttgart, Unterturkheim, Germany
Filed Dec. 14, 1959, Ser. No. 859,266
Claims priority, application Germany Dec. 19, 1958
9 Claims. (Cl. 180—69)

The present invention relates to a hinge construction and arrangement for vehicles, and more particularly to a hinge construction for hoods or lids of modern type motor vehicles.

The arrangement of hinges for engine hoods, luggage compartment lids or the like pivotally secured to the vehicle body raises varied problems. In addition to an arrangement of the hinges in which they are covered and invisible, a matter of fact concept universally accepted in present motor vehicle designs, the position of the hinges has to be chosen that as long as possible a lever arm is produced with respect to the point of action during opening and closing thereof, in order to be able to carry out the opening and closing movements with the smallest possible forces and simultaneously therewith to obtain a relatively large angle of opening for reasons of good accessibility. Furthermore, it is a generally accepted aim of the present motor vehicle design to utilize hinges of as simple as possible a construction.

However, in particular, the arrangement of such hinges entails difficulties with respect to the securing thereof at the corresponding parts of the vehicle superstructure, such as the frame or body of a self-supporting vehicle body. The securing of the relatively fixed hinge parts and the installation or assembly thereof require a special configuration and construction of the places provided therefor in the vehicle superstructure such as the body or frame parts to which the relatively fixed hinge parts are secured. Those parts of the vehicle superstructure, such as the vehicle body or vehicle frame, which are suitable for that purpose, therefore have to be made of complicated construction, especially in combination with the reinforcements provided therefor in order to be able to withstand sufficiently the stresses and loads that may occur thereat.

Furthermore, a simple possibility of disassembly is a requirement ever present that must be considered in order to assure rapid exchange of a damaged hood or lid.

The known constructions of hinge arrangements of the prior art fulfill all of these requirements, at best, only partly or in the alternative, if these requirements are satisfied, this is possible only by considerable structural expenditures and costs connected therewith.

It is known in various constructions of the prior art to secure the hinges to both cowl-support columns, to the underside of the cowl sheet-metal member or to the firewall, whereby, in the latter two cases, the movable hinge parts of the prior art are not arranged at the outer side portions of the hood or, with panoramic windshields, at the projecting corners thereof, but instead are displaced slightly inwardly toward the vehicle center so that the support basis becomes smaller which, in turn, has an unfavorable effect with respect to a stable operation during opening and closing movements of the hood or lid.

The present invention is concerned with the task to provide, with the simplest means, an advantageous hinge arrangement and fastening thereof as regards both the vehicle superstructure and the hinges themselves.

For purposes of solving the problems arising in connection with the basic aim of the present invention, it is proposed, in accordance therewith, to secure the movable hinge levers to both of the sides, i.e., to both lateral side portions of the hood, and to accommodate the hinges or joints thereof in a recess each covered on top thereof and formed by relatively fixed parts of the vehicle superstructure, whereby the recesses are disposed within the region of the points of intersection of the two longitudinal gaps or joints with the transverse gap or joint formed between the hood or lid and adjacent fixed parts of the superstructure, and extend rearwardly behind the aforementioned points of intersection in continuation of the longitudinal gaps or joints. The part of the recesses disposed rearwardly of the point of intersection of the longitudinal gaps with the transverse gap and provided on both sides of the vehicle may be covered only by means of a separate structural part such as a decorative strip or ledge, preferably detachably connected with the vehicle superstructure.

According to another feature in accordance with the present invention, it is proposed with hoods disposed at the front end of the vehicle, such as hoods for the engine compartment, to provide such a construction of the recess that the inner lateral wall thereof is formed by an extension of the cowl sheet-metal member, extending preferably in the vertical direction, whereas the outer lateral wall thereof is also formed by a part of the cowl sheet-metal member and/or by the upper part of the inner wheel casing wall. The rear end wall of each recess is thereby formed by a part of the cowl column, and the bottom thereof by a bottom sheet-metal member preferably also forming part of the cowl sheet-metal member, whereby all of the aforementioned body parts are rigidly connected with each other.

According to still another feature of the present invention, it is proposed to extend the bottom sheet-metal member forwardly and to construct the same as a water drainage channel so that an uninterrupted water drainage results from the inwardly disposed end of the recess up to the forward end thereof which drainage, at every point, is relatively lower than the other adjoining body parts and is directed with an inclination forwardly downwardly. The last-mentioned feature provides also the possibility to obtain for all types of vehicles a completely satisfactory drainage of the water within the respective end portion of the vehicle insofar as this is required. For example, for vehicle types which are provided with a rear engine and, therefore, have the luggage compartment in the front end thereof, a water drainage is necessary for obvious reasons. However, even with front-engine vehicles the lower side of which is completely closed off by means of a sheet-metal bottom member in order to reduce the air resistance and protect against dirt and dust, a water drainage in the forward direction is rendered possible by the teachings in accordance with the present invention.

The bottom sheet-metal member of the recess according to the present invention, also serves for purposes of detachably securing the relatively fixed hinge part which is preferably constructed in the form of a support bracket and provided with a bottom plate.

Accordingly, it is an object of the present invention to provide a hinge construction for hoods and lids of vehicles which obviates the disadvantages of the prior art devices.

Another object of the present invention is the provision of a hinge construction which fulfills in a most satisfactory manner all the requirements concerning simple construction, inexpensive manufacture, relatively easy installation, and satisfactory operation.

Still another object of the present invention resides in the provision and arrangement of hinge means for motor vehicle hoods which are so arranged and constructed as to be invisible in the normal conditions thereof and which provide a relatively wide support basis for the hood.

Still another object of the present invention resides in the provision of a hinge construction and support thereof which, at the same time, effectively constitutes a drainage for water.

A further object of the present invention resides in the provision of a hinge assembly which may be readily installed and easily removed so as to permit facilitated interchange of the hoods in case of damage thereto.

A still further object of the present invention resides in the provision of a hinge construction which is simple, made of relatively few parts, and accommodated unobtrusively in modern type motor vehicles.

Figure 2:
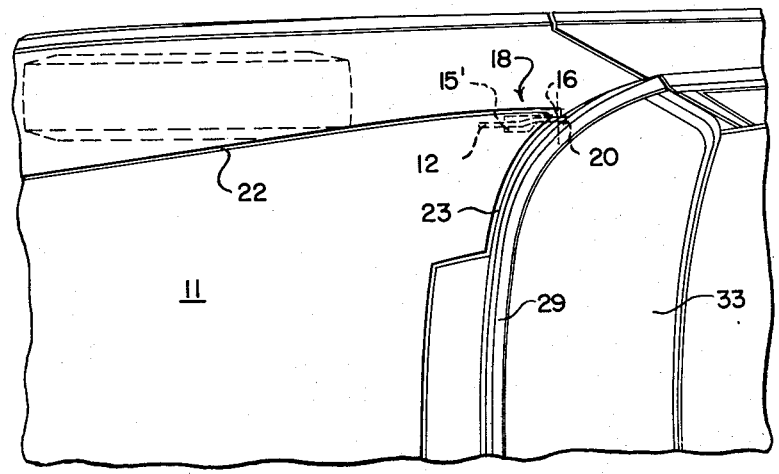
Figure 6:
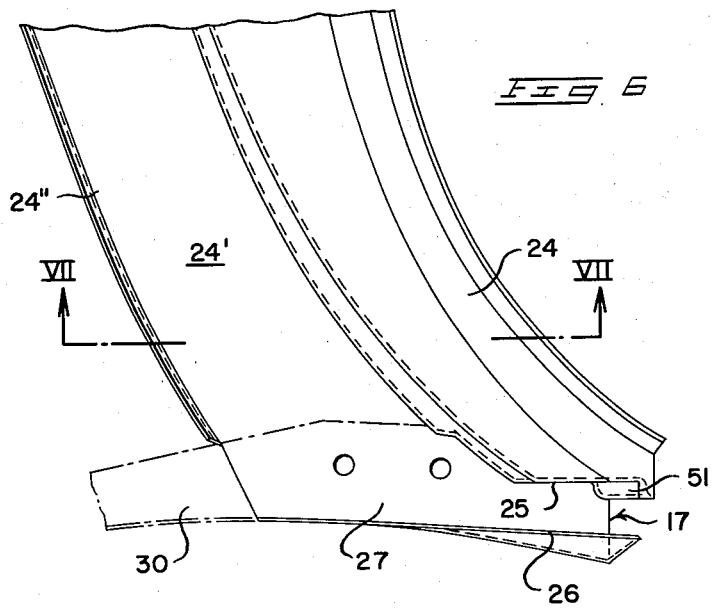
Figure 7:
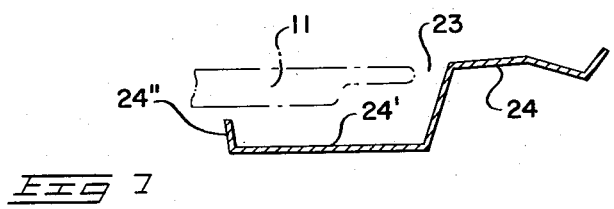
Figure 8:
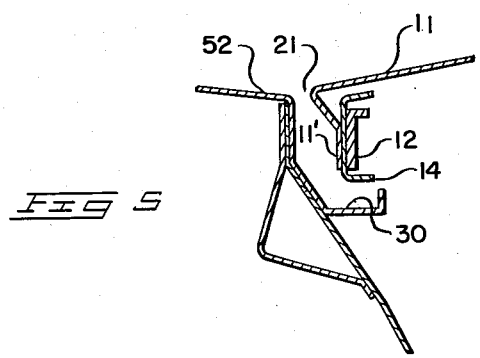

These and other objects, features and advantages of the present invention will become more obvious from the following description, when taken in connection with the accompanying drawing which shows, for purposes of illustration only, two embodiments in accordance with the present invention, and wherein:

FIGURE 1 is a partial side elevational view of the front part of a motor vehicle provided with a panoramic windshield and including a hinge construction in accordance with the present invention, FIGURE 2 is a partial top plan view of the motor vehicle and hinge arrangement of FIGURE 1, FIGURE 3 is a partial top plan view of the motor vehicle parts located within the area of the corner of the hood disposed at the forward windshield, FIGURE 4 is a cross-sectional view taken along line IV—IV of FIGURE 3, FIGURE 5 is a cross-sectional view taken along line V—V of FIGURE 3, FIGURE 6 is a top plan view of the cowl sheet-metal part in accordance with the present invention, FIGURE 7 is a cross-sectional view taken along line VII—VII of FIGURE 6, FIGURE 8 is a partial top plan view of a modified construction of a hinge arrangement in accordance with the present invention for use with the lid of the luggage compartment and arranged rearwardly of the rear windshield, and FIGURE 9 is an enlarged cross-sectional view taken along line IX—IX of FIGURE 8.

The term "vehicle superstructure" is used herein and in the claims to designate a relatively fixed part of the vehicle, such as the frame, chassis frame, or those parts performing analogous functions of a self-supporting type body construction.

Referring now to the drawing, wherein like reference numerals are used throughout the various views to designate corresponding parts, and more particularly to FIGURES 1 to 7, these figures illustrate one embodiment for the arrangement of the pivotal support of a hood 11 to the vehicle superstructure, whereby the hood 11 constitutes the engine hood for a front engine vehicle. The hood 11 is thereby supported on both sides thereof by means of hinges made in accordance with the present invention. While FIGURES 1 through 7 each only show the hinge construction on one respective side of the vehicle, it is understood that in each case the hinge construction of the opposite side of the vehicle is of mirror-image-like construction.

The movable hinge levers 12 are secured to the downwardly bent lateral rim portions 11' (FIGURE 5) of the engine hood by the interposition of suitable reinforcing members 14 (FIGURE 5). The relatively fixed or stationary hinge parts consist of a bearing support or bracket member 15 (FIGURES 1 and 4) provided with a bottom plate 15' (FIGURES 2, 3 and 4). The hinge joints or hinge pins are designated by reference numeral 16 in the various views of the drawing.

The individual hinges or hinge joints 16 are accommodated within recesses generally designated by reference numerals 17 and 18 (FIGURES 2, 3, 4 and 6) which extend within the area of the points of intersection 19 (FIGURE 3) and 20 (FIGURE 2) of the two longitudinal gaps or joints 21 and 22 with the transverse joint or gap 23, and which continue from the aforementioned points of intersection 19 and 20 in extension of the longitudinal gaps 21 and 22. The recesses 17 and 18 are formed by parts of the cowl sheet-metal member 24 (FIGURES 4, 6 and 7). The two lateral longitudinal sides of the recesses 17 and 18 consist of upwardly or downwardly bent parts 25 and 26 (FIGURES 4 and 6) and the bottom or base sheet-metal member thereof of a part 27 (FIGURES 3, 4 and 6) of the cowl sheet-metal member 24. The aforementioned parts 25, 26 and 27 are, therefore, made integrally, in one piece with the cowl sheet-metal member 24, properly speaking, for example, by deep-rolling or deep-drawing. However, it is also understood that these parts 25, 26 and 27 may be made separate of one another and are rigidly connected only subsequently to manufacture thereof with the cowl sheet-metal member 24 in any suitable manner. The rear end face of each recess 17 or 18 is formed by a part 28 (FIGURE 4) of the cowl column member which part 28 is rigidly connected with transversely extending end flaps 51 of the cowl sheet-metal member 24 (FIGURES 4 and 6). The recess 17 and 18 each is closed off against the top thereof by means of a decorative strip 29 (FIGURES 1 through 4) so that the recesses 17 and 18 are effectively closed on all sides thereof. The bottom sheet-metal member 27 which is disposed at every point lower than the other adjoining surfaces, i.e., also with respect to the stepped portion 24' (FIGURE 7) of the cowl sheet-metal member 24, forming a transversely extending water drainage, extends up to the forward edge 24" (FIGURE 7) and is continued thereat by a further sheet-metal part 30 (FIGURES 3 and 6) which becomes tapered forwardly in width and is formed into a drainage channel (FIGURE 5). The bottom sheet-metal member 27 to which the bottom plate 15' of the relatively fixed hinge part 15 is secured by means of bolts 32 under interposition of an elastic part 31 (FIGURE 4) as well as the sheet-metal part 30 extend with a slight downward forward inclination. Reference numeral 33 designates the windshield and reference numeral 52 the wheel casing sheet-metal member.

It is believed that the foregoing description of the arrangement of the hinges in accordance with the present invention readily demonstrates the high degree of simplicity of the construction thereof, the extremely pragmatic arrangement and location thereof within a modern type vehicle having a relatively large windshield, and the good accessibility as well as the possibility of easy assembly and disassembly assured thereby, to name only a few advantages, which result from the present invention.

FIGURES 8 and 9 illustrate a modified embodiment in accordance with the present invention and illustrate the bearing support and arrangement of a luggage compartment hood or lid 34 arranged at the rear end of the motor vehicle. The hinges or joints thereof are accommodated each in a trough-shaped recess generally designated by reference numeral 35 (FIGURE 9), the inner side wall 36, the inner end wall 37 and the bottom 38 of which are formed by a bottom member 39 which is emplaced and secured in the assembled position thereof from below and at the lowest point of which a water drainage 53 is provided. The outer lateral wall 40 of the recess 35 is formed by a part of the inwardly disposed wheel casing wall member. The hinge or hinge joint 41 is covered at the top thereof by means of the cowl sheet-metal member 42 on which is mounted a decorative strip 43. The relatively fixed hinge part 44 is detachably secured to the inner end wall 37 of the bottom member 39 by means of screws, bolts, nuts 45 or the like. The rim of the rear cowl sheet-metal member 42 which extends along the luggage compartment is so shaped as to form a water drainage channel 46. The movable hinge lever is designated by reference numeral 47 in FIGURE 9 while the rear windshield is designated by reference numeral 54. With the luggage compartment lid 34 in the closed position thereof, a gap or joint is left between the outer edge of the lid 34 and the adjoining relatively fixed parts of the vehicle superstructure, this gap or joint being composed of two longitudinal joint portions 48 and of a transverse joint portion 49. The longitudinal joint portions 48 and the transverse joint portion 49 thereby intersect one another forwardly at 50. While the various parts mentioned in the description and/or shown in the drawing are illustrated as made of sheet-metal steel, it is understood that the present invention is not limited thereto but is also of particular use in connection with parts made of other material, such as synthetic plastics, or the like.

While I have shown and described two embodiments in accordance with the present invention, it is understood that the same is not limited thereto but is susceptible of many changes and modifications within the scope and spirit of the present invention and I. therefore, do not wish to be limited to the details shown and described herein, but intend to cover all such changes and modifications as are encompassed by the scope of the appended claims.

I claim:

1. A hinge arrangement for a pivotally secured body member such as a hood, lid or the like, pivotally secured on the vehicle superstructure, especially of motor vehicles provided with panoramic windshields, comprising hinge means having a relatively fixed part secured to said superstructure and a relatively movable part, a hood normally forming a gap with the adjoining vehicle superstructure parts along the two side portions thereof and along one transversely extending end portion thereof, said movable hinge part being secured to said hood at said side portions, said hinge means being accommodated within recesses in said vehicle superstructure closed off on top thereof by a separate structural part forming a portion of said vehicle superstructure, said recesses being disposed within the area of intersection of said longitudinal and transverse gaps and continuing in extension of said longitudinal gaps beyond the points of intersection, said separate structural part being a decorative strip detachably connected with said vehicle superstructure, said vehicle superstructure including a cowl sheet-metal member, cowl column means and wheel casing wall members, the inner lateral wall portion of each recess being formed by an approximately vertically extending continuation of said cowl sheet-metal member, the outer lateral wall portion of each recess being formed by one of said sheet metal and wheel casing wall members, the rear end wall of said recess being formed by a part of said cowl column means, and the bottom thereof being formed by a bottom sheet-metal member also forming part of said cowl sheet-metal member, all of said parts being rigidly connected with one another.

2. A hinge arrangement for a pivotally secured body member such as a hood, lid or the like, pivotally secured on the vehicle superstructure, especially of motor vehicles provided with panoramic windshields, comprising hinge means having a relatively fixed part secured to said superstructure and a relatively movable part, a hood normally forming a gap with the adjoining vehicle superstructure parts along the two side portions thereof and along one transversely extending end portion thereof, said movable hinge part being secured to said hood at said outer side portions, said hinge means being accommodated within recesses in said vehicle superstructure closed off on top thereof by a vehicle superstructure part, said recesses being disposed within the area of intersection of said longitudinal and transverse gaps and continuing in extension of said longitudinal gaps beyond the points of intersection, each recess including inner and outer lateral wall portions, an end face portion and a bottom portion, said vehicle superstructure including cowl means, cowl support means, and wheel casing wall means, the inner lateral wall portion being constituted by a part of said cowl means, the end face portion of each recess being constituted by a part of said cowl support means, the outer lateral wall portion of each recess being formed by one of the two parts consisting of said cowl means and said wheel casing wall means, and the bottom portion of each recess being formed by a part rigidly secured with said cowl means, all of said parts being rigidly connected with each other.

3. A hinge arrangement according to claim 2 further comprising transversely extending end portions at the outer sides of said cowl means for connecting said cowl means with both of said cowl support means.

4. A hinge arrangement according to claim 2 wherein said bottom portion is a separate structural part rigidly connected with said cowl means after manufacture thereof.

5. A hinge arrangement according to claim 2, wherein each bottom portion extends considerably beyond the respective hinge recess, properly speaking, in the direction toward the respective vehicle end.

6. A hinge arrangement according to claim 5, wherein said cowl means includes a forward transversely extending rim portion, and wherein said bottom portion extends up to said transversely extending rim portion.

7. A hinge arrangement according to claim 6, wherein said bottom portion is disposed relatively lower than all adjoining vehicle superstructure parts.

8. A hinge arrangement according to claim 7, wherein said bottom portion extends in the direction toward the respective vehicle end beyond said rim portion of said cowl means and wherein the extension of said bottom portion is constructed as a water drainage channel, said bottom portion together with the extension thereof slanting forwardly downwardly a slight amount.

9. A hinge arrangement according to claim 8, wherein said bottom portion extension is a separate structural part.

References Cited in the file of this patent

UNITED STATES PATENTS

| | | |
|---|---|---|
| 997,621 | Hulbert | July 11, 1911 |
| 2,647,792 | Fleming | Aug. 4, 1953 |
| 2,793,705 | Garrity | May 28, 1957 |
| 2,826,256 | Haltenberger | Mar. 11, 1958 |